(12) United States Patent
Kawaguchi et al.

(10) Patent No.: US 6,213,248 B1
(45) Date of Patent: *Apr. 10, 2001

(54) STEERING CONTROL APPARATUS (75) Inventors: Hiroshi Kawaguchi, Mishima; Nobuyoshi Sugitani, Susono, both of (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/008,322

(22) Filed: Jan. 20, 1998

(30) Foreign Application Priority Data

Feb. 7, 1997 (JP) .................................................. 9-025423

(51) Int. Cl.[7] .................................................. B62D 5/04
(52) U.S. Cl. .................................................. 180/446; 180/402
(58) Field of Search .................................. 180/446, 443, 180/402, 403, 422; 701/41, 42

(56) References Cited

U.S. PATENT DOCUMENTS

| 5,072,803 | * | 12/1991 | Kilian et al. | 180/422 |
| 5,201,380 | * | 4/1993 | Callahan | 180/403 |
| 5,229,955 | * | 7/1993 | Nishiwaki et al. | 364/550 |
| 5,347,458 | * | 9/1994 | Serizawa et al. | 180/446 |
| 5,743,351 | * | 4/1998 | McLaughlin | 180/446 |
| 5,774,819 | * | 6/1998 | Yamamoto et al. | 180/446 |
| 5,828,972 | * | 10/1998 | Asanuma et al. | 180/446 |
| 5,908,457 | * | 6/1999 | Higashira et al. | 701/41 |
| 6,032,755 | * | 3/2000 | Blandino et al. | 180/446 |
| 6,032,757 | * | 3/2000 | Kawaguchi et al. | 180/446 |

FOREIGN PATENT DOCUMENTS

| 6-305433 | 11/1994 | (JP) . |
| 6-98931 | 12/1994 | (JP) . |

* cited by examiner

*Primary Examiner*—J. J. Swann
*Assistant Examiner*—Michael Cuff
(74) *Attorney, Agent, or Firm*—Oliff & Berridge, PLC (57) ABSTRACT

A steering control apparatus of the present invention comprises: a steering shaft on which a steering effort is exerted through a steering wheel; a steering angle detecting device for detecting a steering angle which is an angle of rotation of the steering shaft; a steering shaft driving device for rotating the steering shaft; a steering effort detecting device for detecting the steering effort exerted on the steering shaft through the steering wheel; a turning device for turning a steered wheel, based on the steering angle, the turning device being mechanically separated from the steering shaft; a turning reaction force detecting device for detecting a turning reaction force exerted on the steered wheel; and a turning amount detecting device for detecting a turning amount of the steered wheel; wherein the steering shaft driving device drives the steering shaft, taking account of the steering effort, the turning reaction force, the steering angle, and the turning amount. This can restrain undesired increase in the deviation between a force proportional to the steering effort, and the turning reaction force, appearing in the initial stage of steering, by utilizing the deviation between the target control amount based on the steering angle, and the turning amount. This can achieve driving of the steering shaft with appropriate steering reaction force.

6 Claims, 6 Drawing Sheets

STEERING CONTROL APPARATUS

BACKGROUND OF THE INVENTION

1. Field of the Invention

The present invention relates to a steering control apparatus for turning steered wheels in accordance with rotation of a steering wheel. More particularly, the invention concerns a steering control apparatus wherein a steering shaft connected to the steering wheel is mechanically separated from a turning mechanism for turning the steered wheels and wherein the turning mechanism is controlled an electric control by device.

2. Related Background Art

Figure 6:
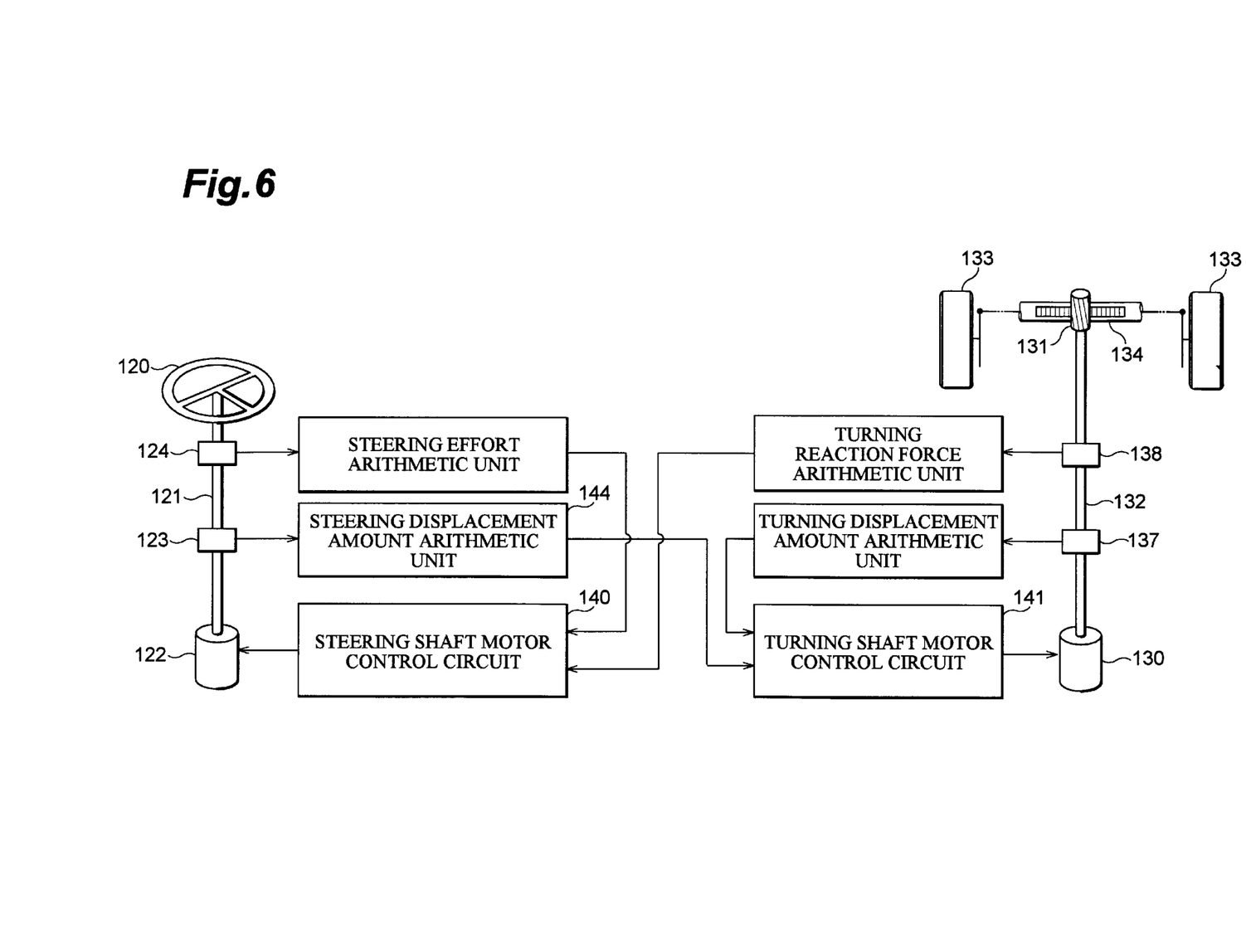
FIG. 6 is a structural drawing to schematically show the conventional steering control apparatus.

An example of the steering control apparatus of this type is disclosed, for example, in Japanese Patent Publication No. 6-98931 and the structure thereof is shown in FIG. 6. A steering shaft motor 122 is attached to a steering shaft 121 mounted with a steering wheel 120, so that the steering shaft motor 122 can rotate the steering shaft 121. When a turning shaft motor 130 rotates a turning shaft 132, a rack shaft 134 in mesh with a pinion 131 provided at the tip of the turning shaft is displaced along the axial direction, whereby tires 133 are turned in synchronism with the motion of this rack shaft 134. At this time a turning shaft motor control circuit 141 controls driving of the turning shaft motor 130 so that a turning amount detected by a turning displacement amount sensor 137 may be coincident with a target control amount calculated by a steering displacement amount arithmetic unit 144. At the same time as it, a turning reaction force sensor 138 detects turning reaction force exerted on the turning shaft 132 upon this turning operation and a steering effort sensor 124 detects a steering effort exerted on the steering shaft 121. A steering shaft motor control circuit 140 drives the steering shaft motor 122, based on a deviation between the steering effort and the turning reaction force detected by the two sensors 124, 138.

In this way the control of driving of the steering shaft 121 is carried out based on the deviation between the steering effort detected by the steering effort sensor 124 and the turning reaction force detected by the turning reaction force sensor 138. This turning reaction force is, however, detected as a result of such operation that a steering angle sensor 123 first detects a steering angle, the turning shaft motor 130 rotates the turning shaft 132 according to this steering angle, the rotation of the turning shaft 132 displaces the rack shaft 134 to actually turn the tires 133, and the actual turning of tires generates axial force. Therefore, no turning reaction force exists in the initial stage of steering, and the steering effort is thus reflected in the control of rotation of steering shaft 121 as it is. This results in increasing the rotation amount of steering shaft 121 by the steering shaft motor 122, so that the steering reaction force is small. After a while, the tires 133 are actually turned to generate the axial force (turning reaction force) so as to decrease the deviation between the steering effort and the turning reaction force, whereupon the rotation of steering shaft 121 is restrained, thereby increasing the steering reaction force. There appears a phase shift (a temporal shift) between the steering amount of steering wheel 120 and the steering reaction force as described above. This degraded the steering feeling of driver, so as to raise the incompatible steering feeling.

SUMMARY OF THE INVENTION

The present invention has been accomplished to solve the above problem and an object of the invention is to provide a steering control apparatus that can relieve the incompatible steering feeling as described above and thus improve the steering feeling.

A steering control apparatus of the present invention comprises: a steering shaft on which a steering effort is exerted through a steering wheel; steering angle detecting means for detecting a steering angle which is an angle of rotation of the steering shaft; steering shaft driving means for rotating the steering shaft; steering effort detecting means for detecting the steering effort exerted on the steering shaft through the steering wheel; turning means for turning a steered wheel, based on the steering angle, the turning means being mechanically separated from the steering shaft; turning reaction force detecting means for detecting a turning reaction force exerted on the steered wheel; and turning amount detecting means for detecting a turning amount of the steered wheel; wherein the steering shaft driving means drives the steering shaft, taking account of the steering effort, the turning reaction force, the steering angle, and the turning amount.

The steering shaft driving means desirably drives the steering shaft, based on a deviation between a force proportional to the steering effort, and the turning reaction force and a deviation between a target control amount based on the steering angle, and the turning amount. Further, the steering shaft driving means desirably drives the steering shaft, based on a control amount obtained by subtracting a value based on the deviation between the target control amount based on the steering angle, and the turning amount from a value based on the deviation between the force proportional to the steering effort, and the turning reaction force.

In the initial stage of steering the increase in the turning reaction force tends to lag because of a delay of response of the turning operation. This makes the deviation between the force proportional to the steering effort, and the turning reaction force greater than necessary. The steering control apparatus of the present invention can restrain the undesired increase in the deviation between the force proportional to the steering effort, and the turning reaction force, appearing in the initial stage of steering, by utilizing the deviation between the target control amount based on the steering angle, and the turning amount. This can drive the steering shaft with appropriate steering reaction force.

The steering shaft driving means may be one wherein the steering shaft driving means drives the steering shaft, based on a control amount obtained by subtracting a value based on the deviation between the target control amount based on the steering angle, and the turning amount and a value based on the change rate of the deviation between the target control amount based on the steering angle, and the turning amount from a value based on the deviation between the force proportional to the steering effort, and the turning reaction force.

This can restrain the undesired increase in the deviation between the force proportional to the steering effort, and the turning reaction force, occurring in the initial stage of steering, by also utilizing the change rate of the deviation between the target control amount based on the steering angle, and the turning amount, thereby preventing abrupt steering.

The steering shaft driving means may also be one for driving the steering shaft, taking account of the steering effort, turning reaction force, and steering angle. In this case, the undesired increase in the deviation between the force proportional to the steering effort, and the turning reaction force, appearing in the initial stage of steering, can be restrained by utilizing the steering angle.

This permits the steering shaft drive control with appropriate steering reaction force to be carried out even for small steering amounts.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The first embodiment of the present invention will be described by reference to the accompanying drawings.

Figure 1:
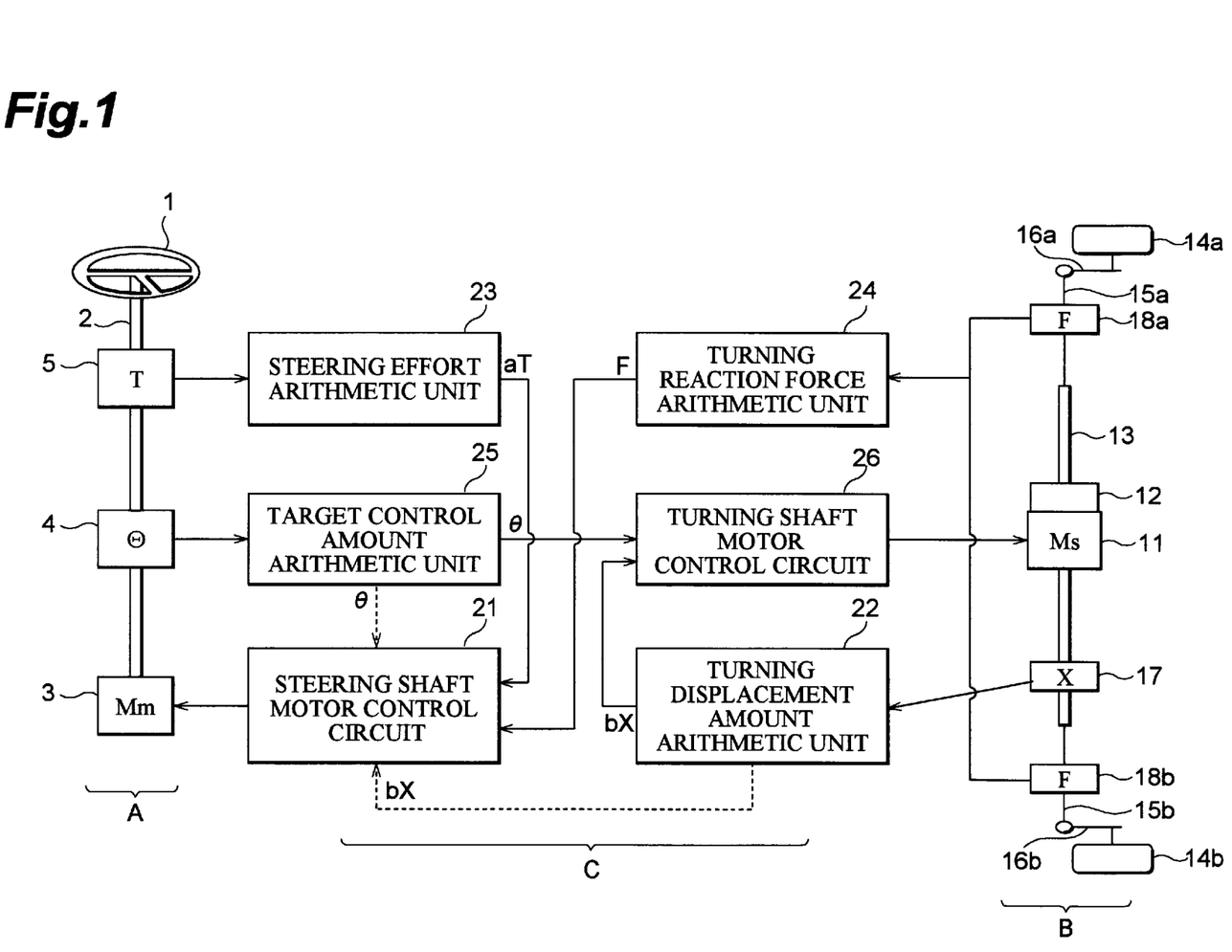
FIG. 1 is a block diagram to show the structure of the steering control apparatus according to the first embodiment of the present invention.

FIG. 1 schematically shows the structure of the steering control apparatus according to the present embodiment. This steering control apparatus is composed of master section A to be manipulated by a driver, slave section B for turning the steered wheels, and control section C for electrically controlling the master section A and slave section B.

The master section A has steering shaft 2 on which steering wheel 1 is mounted, and steering shaft motor 3 for rotating the steering shaft 2, and the steering shaft 2 is provided with steering angle sensor 4 for detecting the steering angle $\Theta$ of the steering shaft 2 and steering effort sensor 5 for detecting steering effort T.

The slave section B has turning shaft motor 11 as a drive source for displacing turning shaft 13, and converter 12 for axially displacing the turning shaft 13 by converting rotational motion of the turning shaft motor 11 into rectilinear motion is provided between the turning shaft motor 11 and the turning shaft 13. Each of the two ends of the turning shaft 13 is connected through tie rod 15a, 15b and knuckle arm 16a, 16b to steered wheel 14a, 14b, thereby composing a mechanism for axially displacing the turning shaft 13 to turn each steered wheel 14a, 14b according to an amount and a direction of the displacement.

Each tie rod 15a, 15b is equipped with turning reaction force sensor 18a, 18b for detecting the axial force (turning reaction force) exerted on each tie rod 15a, 15b by the left or right steered wheel 14a, 14b. The turning shaft 13 is provided with turning displacement amount sensor 17 for detecting a displacement amount of this turning shaft 13. A real turning amount of the steered wheels 14a, 14b can be detected by detecting the displacement amount of turning shaft 13 by the turning displacement amount sensor 17.

The control section C has steering shaft motor control circuit 21 for controlling the drive of steering shaft motor 3 and turning shaft motor control circuit 26 for controlling the drive of turning shaft motor 11 and performs the drive controls of the two motors, based on arithmetic results from respective arithmetic units and other data.

The turning shaft motor control circuit 26 receives arithmetic results of turning displacement amount arithmetic unit 22 and target control amount arithmetic unit 25. The turning displacement amount arithmetic unit 22 obtains a displacement amount of the turning shaft 13 as a turning displacement amount (turning amount) X, based on the detection result of the turning displacement amount sensor 17, and outputs a control amount bX (where b is a coefficient corresponding to a gear ratio of turning displacement) proportional to the turning displacement amount X. The target control amount arithmetic unit 25 calculates from the steering angle $\Theta$ detected by the steering angle sensor 4 a target control amount $\theta$ which is a target in the turning control, i.e., in turning the steered wheels 14a, 14b in correspondence to the steering angle.

Based on the arithmetic result of the turning displacement amount arithmetic unit 22 and the arithmetic result of the target control amount arithmetic unit 25, the turning shaft motor control circuit 26 controls the drive of the turning shaft motor 11 so that a turning amount of the steered wheels 14a, 14b becomes equal to the target control amount $\theta$. Namely, the control displacement amount Ms of the turning shaft 13 is calculated according to Eq. (1) below and a turning control signal according to the control displacement amount Ms is outputted to the turning shaft motor 11. In Eq. (1) "Gs" is a gain coefficient indicating the gain of the turning control signal.

$$Ms = Gs \times (\theta - bX) \tag{1}$$

The steering shaft motor control circuit 21 receives the arithmetic results of steering effort arithmetic unit 23 and turning reaction force arithmetic unit 24 and, for calculating ($\theta - bX$) as shown in Eq. (2) below, it also receives the above-stated control amount bX from the steering displacement amount arithmetic unit 22 and the above-stated target control amount $\theta$ from the target control amount arithmetic unit 25. The steering effort arithmetic unit 23 calculates the steering effort T exerted on the steering shaft 2, based on the detection result of the steering effort sensor 5, and also calculates a control amount aT (where a is a coefficient corresponding to a gear ratio of steering effort) for rotating the steering shaft 2 in the direction of exertion of the steering effort T.

The turning reaction force arithmetic unit 24 calculates the turning reaction force F exerted on the turning shaft 13, based on the detection results of the turning reaction force sensors 18a, 18b. The steering shaft motor control circuit 21 calculates a rotation control amount Mm of the steering shaft motor 3 according to Eq. (2) below, based on these arithmetic results of the 1s steering effort arithmetic unit 23, turning reaction force arithmetic unit 24, turning displacement amount arithmetic unit 22, and target control amount arithmetic unit 25, and outputs a steering control signal according to the rotation control amount Mm to the steering shaft motor 3.

$$Mm = Gm \times (aT - F) + Cm3(\theta - bX) + Cm4 \times d/dt(\theta - bX) \quad (2)$$

In Eq. (2), Gm, Cm3, and Cm4 are gain coefficients, Gm being positive and Cm3 and Cm4 being negative.

The operation of the steering control apparatus constructed in the above structure will be schematically described below. Let us suppose that during straight-ahead driving of vehicle the steering wheel 1 is so manipulated as to exert, for example, counterclockwise torque on the steering shaft 2. Since the steering shaft motor 3 is not rotating the steering shaft 2 yet at the start of rotation of steering wheel 1, torsion appears in the steering shaft 2. This torsion in the steering shaft 2 is detected by the steering effort sensor 5 and the steering effort arithmetic unit 23 calculates the steering effort T from this detection result and outputs the control amount aT obtained by multiplying the steering effort T by the coefficient a.

The steering shaft motor control circuit 21 puts the control amount aT from the steering effort arithmetic unit 23, the turning reaction force F from the turning reaction force arithmetic unit 24, the target control amount θ from the target control amount arithmetic unit 25, and the control amount bX from the turning displacement amount arithmetic unit 22 into above Eq. (2) to calculate the steering shaft rotation control amount Mm and outputs the steering control signal indicating it. Since the turning reaction force F, the target control amount θ, and the control amount bX all are zero at the start of rotation of the steering wheel 1, the steering shaft motor 3 receives the steering control signal of Mm=Gm×aT. In response to this steering control signal, the steering shaft motor 3 rotates the steering shaft 2 counterclockwise.

This rotation causes the steering angle Θ from the steering angle sensor 4 to be supplied to the target control amount arithmetic unit 25, and the target control amount arithmetic unit 25 calculates the target control amount θ, based on the steering angle Θ, and outputs the arithmetic result to the turning shaft motor control circuit 26 and to the steering shaft motor control circuit 21. At this time, since the turning displacement amount X of the turning shaft 13 is still zero, the turning shaft motor control circuit 26 outputs the control signal indicating the control displacement amount Ms=Gs×θ obtained from above Eq. (1) to the turning shaft motor 11 to start displacing the turning shaft 13 to the right and to start turning the left and right steered wheels 14a, 14b to the left.

As this displacement of the turning shaft 13 increases values of turning displacement amount X, values of control displacement amount Ms according to above Eq. (1) decrease. When the control amount bX proportional to the turning shaft displacement amount X becomes nearly equal to the target control amount θ, the motion of the turning shaft 13 stops.

On the other hand, the left and right steered wheels 14a, 14b receive rightward turning reaction force from the road surface when turned to the left. The turning reaction force sensors 18a, 18b detect force according to this turning reaction force and supply the detection results to the turning reaction force arithmetic unit 24. The turning reaction force arithmetic unit 24 calculates the turning reaction force F, based on the signals from the turning reaction force sensors 18a, 18b, and outputs it to the steering shaft motor control circuit 21.

The steering shaft motor control circuit 21 calculates the rotation control amount Mm of the steering shaft 2 according to Eq. (2), based on the control amount aT, turning reaction force F, target control amount θ, and control amount bX, as described previously, and outputs the drive control signal according to the steering shaft rotation control amount Mm to the steering shaft motor 3. Noting the first term of the righthand side in Eq. (2), increase in the turning reaction force F due to the turning will decrease values of steering shaft rotation control amount Mm; when the turning reaction force F becomes nearly equal to the control amount aT proportional to the steering effort T, the steering shaft 2 stops at a rotational position at that time. The second and third terms of the righthand side in the same equation act to determine proper steering reaction force during the steering operation so as to eliminate the incompatible steering feeling. The action will be described hereinafter.

If the driver intends to further rotate the steering wheel 1 counterclockwise, the steering shaft motor 3 will rotate the steering shaft 2 counterclockwise and the turning shaft motor 11 will turn the steered wheels 14a, 14b to the left. Conversely, if the driver relaxes the steering effort, the control amount aT will become smaller than the turning reaction force F and values of steering shaft rotation control amount Mm will become negative. Then the steering shaft motor 3 will rotate the steering shaft 2 clockwise. Since this decreases the target control amount θ, values of turning control displacement amount Ms become negative and the turning shaft motor 11 turns the steered wheels 14a, 14b to the right.

Although the above description was given with the example of operation where the tires (steered wheels) were turned to the left from straight-ahead driving, the proper turning according to the steering operation can also be carried out similarly in the operation where the tires are turned to the right from straight-ahead driving, by controlling the steering shaft motor 3 and turning shaft motor 11, respectively, based on Eqs. (1) and (2).

Figure 2A:
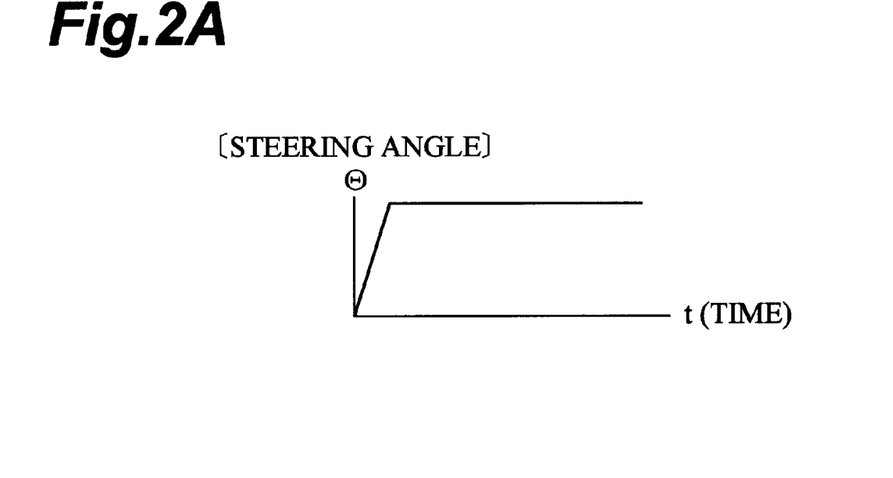
FIG. 2A is a graph to show an example of change of steering angle $\Theta$.
Figure 2B:
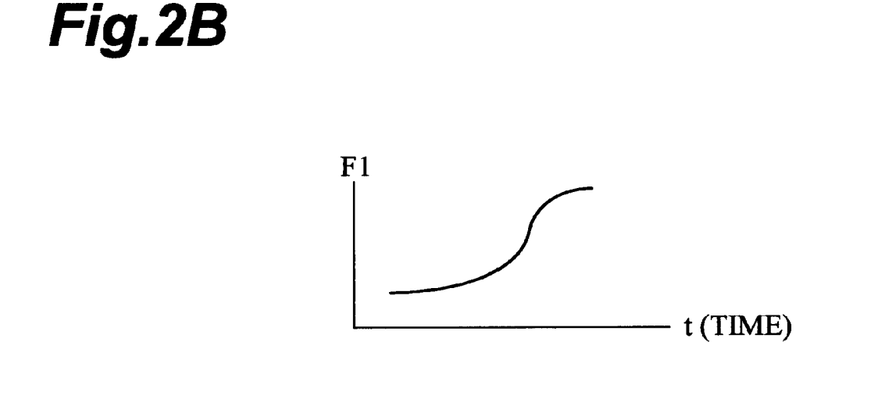
FIG. 2B is a graph to show a changing state of the steering reaction force where the change in the steering angle $\Theta$ is as shown in FIG. 2A and where the control of steering shaft is carried out based on the deviation between steering effort and turning reaction force.

The steering control is carried out as described above. When the steering wheel 1 is rotated quickly, the steering angle Θ detected by the steering angle sensor 4 immediately increases as shown in FIG. 2A and the target control amount θ corresponding thereto also immediately increases. In contrast with it, the turning reaction force F has a delay in increase when compared with the increase of steering angle Θ, as described previously, and the steering effort T also has a delay of increase. If the rotation control amount Mm were determined by only the deviation between the turning reaction force and the force proportional to the steering effort as indicated by Gm×(aT−F) in the first term of Eq. (2) the steering reaction force F1 in that case would be small in the initial stage of steering and then increase with a delay as shown in FIG. 2B, resulting in the great incompatible steering feeling.

Figure 2C:
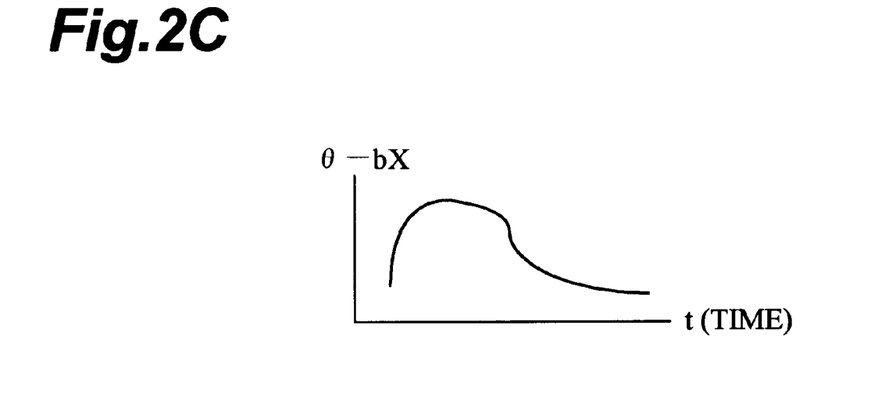
FIG. 2C is a graph to show a changing state of deviation between the target control amount based on the steering angle, and the turning amount where the change in the steering angle $\Theta$ is as shown in FIG. 2A.

For compensating for this phenomenon, Cm3×(θ−bX) is added as the second term to Eq. (2). The addition of this second term results in achieving the following action. If the turning displacement amount (bX) of the turning shaft 13 has a delay from the increase of target control amount θ in the initial stage of steering, the deviation (θ−bX) will increase steeply as shown in FIG. 2C. Since the gain coefficient Cm3 is a negative constant, the increase of deviation (θ−bX) will act to decrease the rotation control amount Mm of the steering shaft motor 3 and to restrain the increase in the rotation angle (steering angle Θ) of the steering wheel 1, so as to increase the steering reaction force. This action greatly works in the initial stage of steering where the deviation (θ−bX) is large. The deviation (θ−bX) gradually decreases with a lapse of time after start of steering as shown in FIG. 2C, because of the action of increasing bX. This action prevents steep increase in the steering reaction force in the later stage.

Since the proper steering reaction force can be given to the steering wheel 1 from the initial stage of steering by subtracting the control amount according to the deviation between the target control amount θ and the turning displacement amount bX indicated by the second term of the righthand side in Eq. (2), from the control amount according to the deviation between the turning reaction force F and the force aT proportional to the steering effort indicated by the first term of the righthand side in Eq. (2) as described above, the phase shift can be eliminated between the steering amount of the steering wheel 1 and the steering reaction force exerted on the steering wheel 1, whereby the steering feeling can be improved.

In addition, the third term indicated by (Cm4×d/dt(θ−bX)) is further added to Eq. (2). The following action is achieved by the addition of the third term indicating the change rate of deviation between the target control amount θ and the turning displacement amount bX. In the initial stage of steering the turning displacement amount (bX) of the turning shaft 13 lags the increase of target control amount θ, thus increasing the deviation (θ−bX). Since Cm4 is a negative value, larger values of the change rate d/dt(θ−bX) act to retrain the increase of rotation control amount Mm based on the first term.

This increases the steering reaction force, so as to act to restrain the increase of rotation angle (steering angle Θ)) of the steering wheel 1. In the initial stage of steering, the faster the changing rate of deviation d/dt(θ−bX), the greater this action works. The change rate of deviation d/dt(θ−bX) gradually decreases with a lapse of time after start of steering, because of the action of increasing bX. This action prevents steep increase in the steering reaction force in the later stage.

When the steering wheel 1 is released for returning it to the neutral, the steering effort T becomes zero. Then the first term in Eq. (2) takes a negative value according to the magnitude of the turning reaction force F. Then the steering wheel 1 becomes about to quickly move toward the neutral point, but thanks to the third term, force for restraining this motion can be generated by the steering shaft motor 3.

In this way the addition of the third term permits the steering reaction force to be given in the early stage prior to the increase in the deviation and permits greater resistance to be produced to faster manipulation of the steering wheel 1, whereby the steering feeling can be improved more and over rotation of the steering wheel 1 can be restrained.

Figure 3:
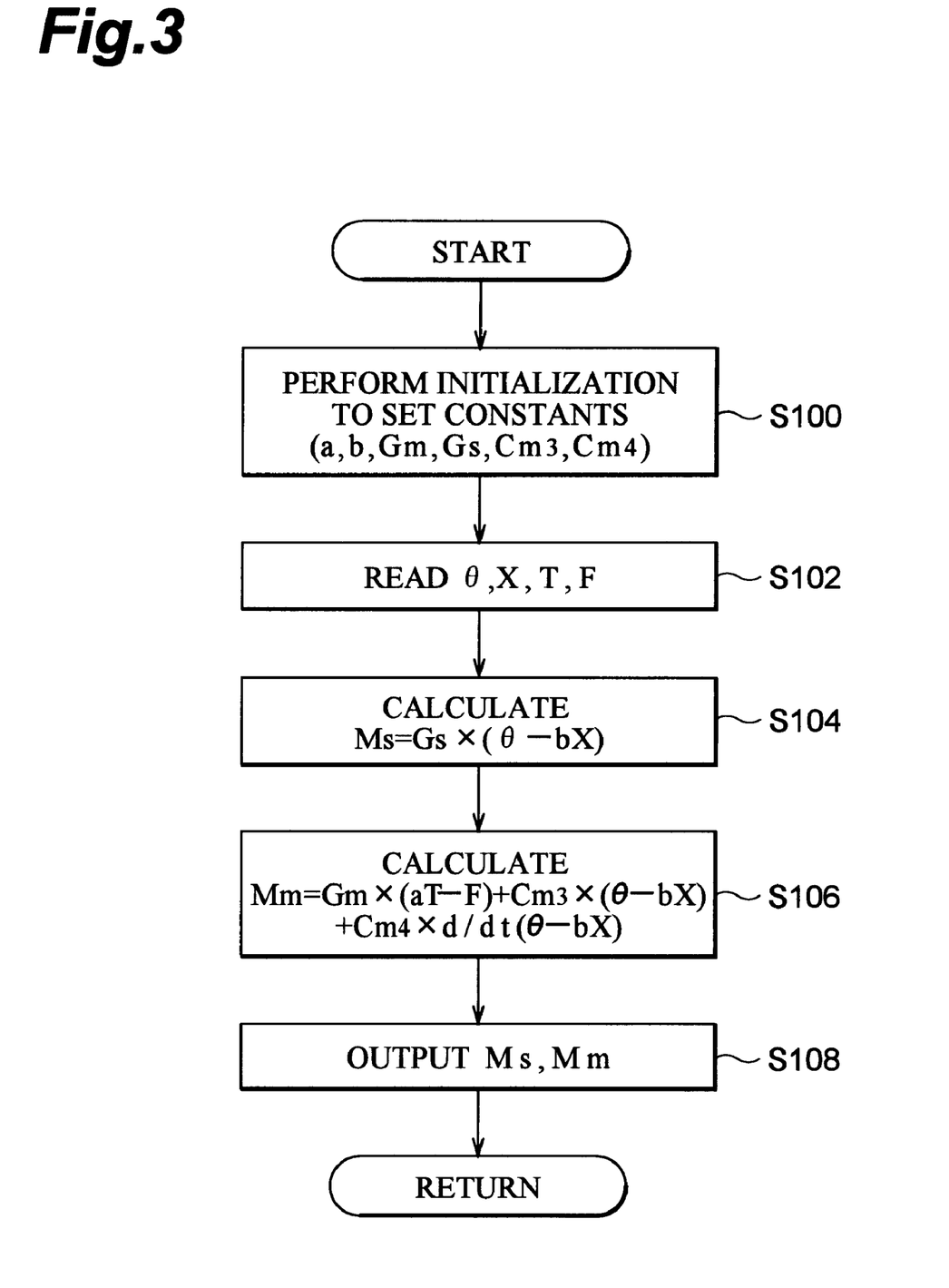
FIG. 3 is a flowchart to show a control process carried out in the steering shaft motor control circuit and turning shaft motor control circuit.

The control process carried out in the steering shaft motor control circuit 21 and turning shaft motor control circuit 26 will be schematically described based on the flowchart of FIG. 3. This flowchart is started with on of the ignition switch and is carried out every predetermined time (for example, every 2 msec).

First, in step 100 ("step" will be denoted hereinafter by "S"), the values of a, b, Gm, Gs, Cm3, and Cm4 preliminarily stored in a ROM are read, thereby carrying out initialization. In subsequent S102, the target control amount θ corresponding to the steering angle Θ, the turning displacement amount X corresponding to the turning angle of the steered wheels 14a, 14b, the steering effort T calculated by the steering effort arithmetic unit 23, and the turning reaction force F calculated by the turning reaction force arithmetic unit 24 each are read. In next S104, using the values read in S102 and before, the control displacement amount Ms is calculated according to foregoing Eq. (1). In S106, similarly using the values read in S102 and before, the rotation control amount Mm is calculated according to foregoing Eq. (2). Then in S108, the turning control signal according to the control displacement amount Ms being the arithmetic result in S104 is outputted to the turning shaft motor 11 and the reaction force control signal according to the rotation control amount Mm being the arithmetic result in S106 is outputted to the steering shaft motor 3.

The steering shaft motor control circuit 21 and turning shaft motor control circuit 26 repetitively carry out this control process at intervals of the predetermined time, thereby performing the steering control.

The first embodiment described above showed the example wherein the control of driving of the turning shaft motor 11 was carried out by feeding the output of turning displacement amount sensor 17 back, but the present invention is not limited to only the cases adopting such feedback control. For example, it can be contemplated that the turning shaft motor 11 is a step motor, a rotation amount of this step motor is calculated according to the target control amount θ, and rotation of the step motor is controlled based on a result of the calculation. In this case the feedback control is unnecessary.

Figure 4:
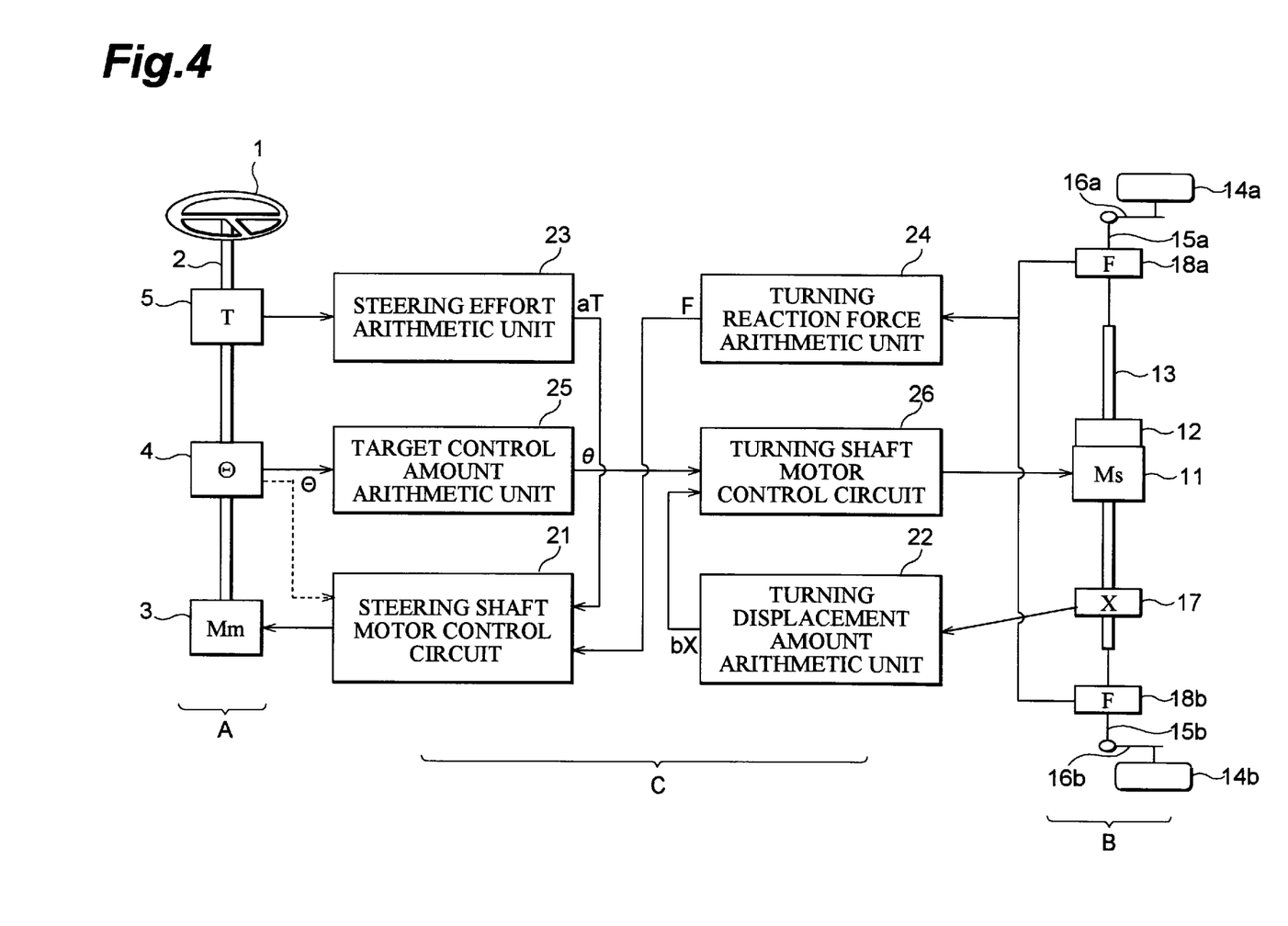
FIG. 4 is a block diagram to show the structure of the steering control apparatus according to the second embodiment of the present invention.

A block diagram of the steering control apparatus according to the second embodiment is shown in FIG. 4. In the drawing the components having the same functions as those in FIG. 1 are denoted by the same reference symbols and the description thereof is omitted herein.

In this second embodiment, the turning shaft motor control circuit 26 receives the arithmetic results of the turning displacement amount arithmetic unit 22 and target control amount arithmetic unit 25 and calculates the control displacement amount Ms of the turning shaft 13 according to Eq. (1), based thereon, as in the first embodiment.

The steering shaft motor control circuit 21 receives the arithmetic results of the steering effort arithmetic unit 23 and turning reaction force arithmetic unit 24 and also receives the steering angle Θ detected by the steering angle sensor 4, which is a difference from the first embodiment. Based on the arithmetic results of these steering effort arithmetic unit 23 and turning reaction force arithmetic unit 24 and the detection result of the steering angle sensor 4, this steering shaft motor control circuit 21 calculates the rotation control amount Mm of the steering shaft motor 3 according to Eq. (3) below and outputs a steering control signal according to the rotation control amount Mm to the steering shaft motor 3. In Eq. (3), Gm and Cm5 are gain coefficients indicating gains of steering control signal, Gm being positive and Cm5 being negative.

$$Mm = Gm \times (aT - F) + Cm5 \times d/dt(\Theta) \tag{3}$$

The action of the second term of the righthand side in Eq. (3) will be described. When the steering wheel 1 is rotated quickly, the steering angle Θ detected by the steering angle sensor 4 immediately increases as shown in aforementioned FIG. 2A, whereas the turning reaction force F has a delay of increase as against the increase of steering angle Θ, as described previously. If the steering control amount Mm were determined by only the first term the control amount Mm would be likely to become large in the initial stage of steering and the steering feeling would be lighter than necessary, as in the first embodiment.

Therefore, the term of $Cm5\times d/dt(\Theta)$ indicated by the second term of the righthand side is added. This increases the steering angular velocity $d/dt(\Theta)$ with quick rotation of the steering wheel 1. This increase restrains the increase in the rotation control amount Mm of the steering shaft motor 3, so as to act to restrain the increase in the rotation angle (steering angle $\Theta$) of the steering wheel 1, thus increasing the steering reaction force. The larger the steering angular velocity $d/dt(\Theta)$, the greater this action works.

The steering angular velocity $d/dt(\Theta)$ shows large values in the initial stage of steering but gradually decreases thereafter. This action prevents steep increase in the steering reaction force in the later stage.

The addition of the term of $Cm5\times d/dt(\Theta)$ to Eq. (3) permits the steering reaction force to quickly rise especially in the small steering angle region and permits the steering feeling to be improved further. Further, when the steering wheel 1 is released for returning it to the neutral, the steering wheel 1 becomes about to quickly move toward the neutral point because of the turning reaction force F. The force for restraining this motion can be generated by the steering shaft motor 3.

Figure 5:
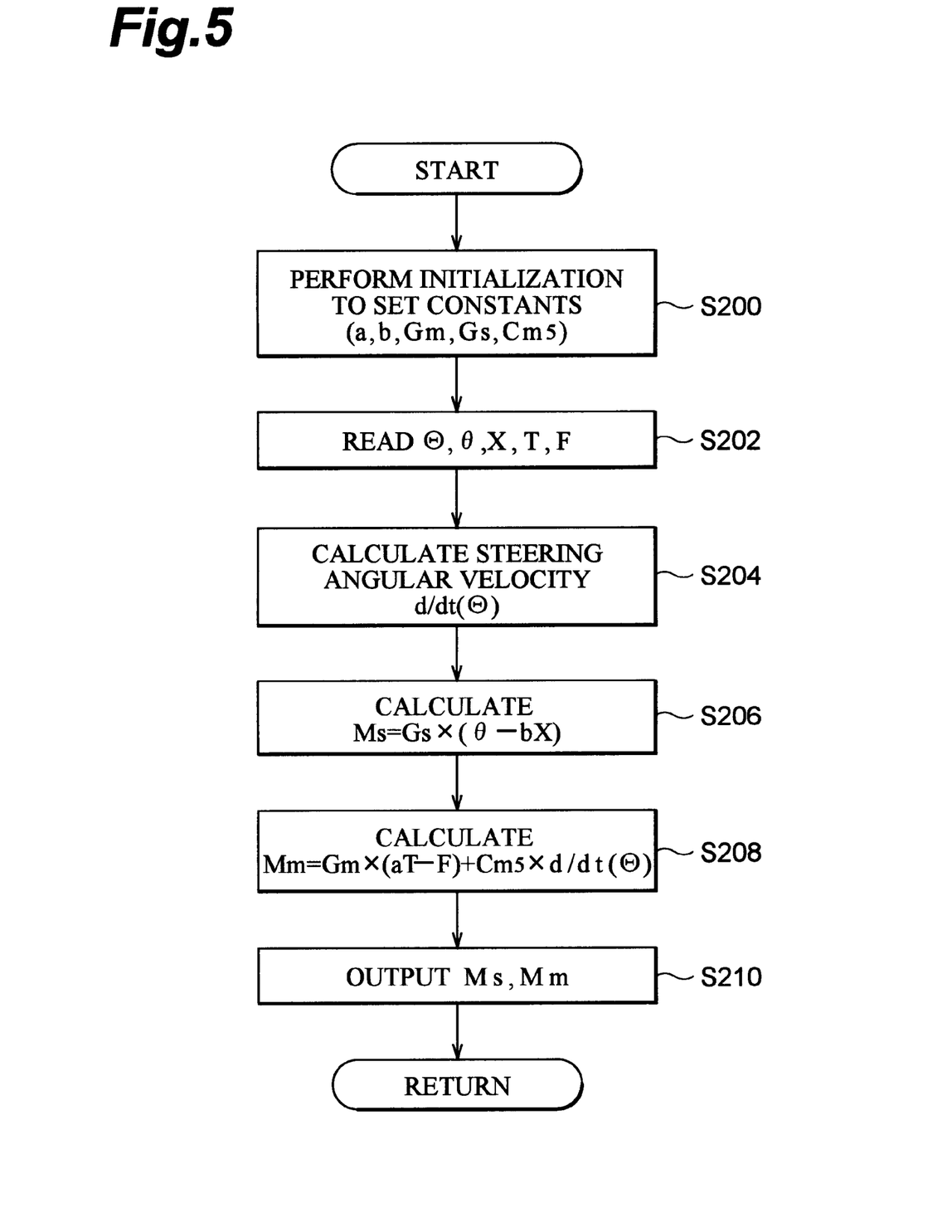
FIG. 5 is a flowchart to show a control process carried out in the steering shaft motor control circuit and turning shaft motor control circuit.

The control process carried out in the steering shaft motor control circuit 21 and turning shaft motor control circuit 26 will be schematically described based on the flowchart of FIG. 5. This flowchart is started with on of the ignition switch and is carried out every predetermined time (for example, every 2 msec).

In step 200, the values of a, b, Gm, Gs, and Cm5 preliminarily stored in the ROM are read, thereby carrying out initialization. In subsequent S202, the steering angle $\Theta$ detected by the steering angle sensor 4, the target control amount $\theta$ calculated by the target control amount arithmetic unit 25, the turning displacement amount X corresponding to the turning angle of the steered wheels 14a, 14b, the steering effort T calculated by the steering effort arithmetic unit 23, and the turning reaction force F calculated by the turning reaction force arithmetic unit 24 each are read. In subsequent S204, the steering angular velocity $d/dt(\Theta)$ is calculated based on the steering angle $\Theta$ read in S202. In next S206, using the values read in S202 and before, the control displacement amount Ms is calculated according to foregoing Eq. (1). In S208, similarly using the steering angular velocity $d/dt(\Theta)$ calculated in S204 in addition to the values read in S202 and before, the rotation control amount Mm is calculated according to foregoing Eq. (3). Then in S210, the turning control signal according to the control displacement amount Ms being the arithmetic result in S206 is outputted to the turning shaft motor 11 and the steering control signal according to the rotation control amount Mm being the arithmetic result in S208 is outputted to the steering shaft motor 3.

The second embodiment described above is arranged so that the calculation of steering angular velocity $d/dt(\Theta)$ executed in the steering shaft motor control circuit 21 is carried out based on the value of steering angle $\Theta$ detected by the steering angle sensor 4, but it can also be contemplated that the target control amount $\theta$ calculated in the target control amount arithmetic unit 25 is supplied to the steering shaft motor control circuit 21 and that the steering shaft motor control circuit 21 calculates the steering angular velocity by $d/dt(\theta)$, using this target control amount $\theta$. In this case, Eq. (3) is replaced by Eq. (4) below.

$$Mm=Gm\times(aT-F)+Cm5\times d/dt(\theta) \quad (4)$$

As described above, the first steering control apparatus of the present invention adopts the structure for performing the control of driving of the steering shaft driving means, based on the steering effort, turning reaction force, steering angle, and turning displacement amount, whereby the control of driving of the steering shaft driving means can be carried out based on not only the deviation between the force proportional to the steering effort, and the turning reaction force, but also the deviation between the steering angle and the turning displacement amount, so that the optimum steering reaction force can be generated from the initial stage of steering, so as to relieve the incompatible steering feeling, thus improving the steering feeling.

Another steering control apparatus of the present invention is arranged so that the control of driving of the steering shaft driving means is carried out, also taking account of the change rate of deviation between the steering angle and the turning displacement amount, whereby the steering reaction force can be applied in the early stage prior to the increase in the deviation, which can improve the steering feeling more and restrain the over rotation of the steering wheel.

Further, still another steering control apparatus of the present invention adopts the structure for carrying out the control of driving of the steering shaft driving means, based on the deviation between the force proportional to the steering effort, and the turning reaction force and based on the change rate of steering angle, whereby the control of driving of the steering shaft driving means can be carried out, taking account of not only the deviation between the force proportional to the steering effort, and the turning reaction force but also the steering angular velocity, which can quickly raise the steering reaction force in the small steering angle region and relieve the incompatible steering feeling, thereby improving the steering feeling.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus comprising:

a steering shaft on which a steering effort is exerted through a steering wheel;

steering angle detecting means for detecting a steering angle which is an angle of rotation of said steering shaft;

steering shaft driving means for rotating said steering shaft;

steering effort detecting means for detecting the steering effort exerted on said steering shaft through said steering wheel;

turning means for turning a steered wheel, based on said steering angle, said turning means being mechanically separated from said steering shaft;

turning reaction force detecting means for detecting a turning reaction force exerted on said steered wheel;

turning amount detecting means for detecting a turning amount of said steered wheel; and control means for determining a steering control signal indicative of a steering shaft rotation control amount at least based on a first value equal to a deviation between a force proportional to the steering effort and the turning reaction force and a second value equal to a deviation between a target control amount based on the steering angle and the turning amount and for applying the steering control signal to the steering shaft driving means to rotate the steering wheel with a steering reaction force.

2. A steering control apparatus according to claim 1, wherein said steering shaft driving means rotates said steering shaft, based on the steering shaft rotation control amount obtained by subtracting the second value from the first value.

3. A steering control apparatus according to claim 1, wherein said steering shaft driving means rotates said steering shaft, based on the first value, the second value, and a third value equal to a change rate of the second value.

4. A steering control apparatus according to claim 3, wherein said steering shaft driving means rotates said steering shaft, based on a control amount obtained by subtracting the second value and the third value from the first value.

5. A steering control apparatus comprising:

a steering shaft on which a steering effort is exerted through a steering wheel;

steering angle detecting means for detecting a steering angle which is an angle of rotation of said steering shaft;

steering shaft driving means for rotating said steering shaft;

steering effort detecting means for detecting the steering effort exerted on said steering shaft through said steering wheel;

turning means for turning a steered wheel, based on said steering angle, said turning means being mechanically separated from said steering shaft;

turning reaction force detecting means for detecting a turning reaction force exerted on said steered wheel; and control means for determining a steering control signal indicative of a steering shaft rotation control amount based on at least a first value equal to a deviation between a force proportional to said steering effort and said turning reaction force, and a second value equal to a change rate of said steering angle and for applying the steering control signal to the steering shaft driving means to rotate the steering wheel with a steering reaction force.

6. A steering control apparatus according to claim 5, wherein said steering shaft driving means rotates said steering shaft, based on the steering shaft rotation control amount obtained by subtracting the second value from the first value.

* * * * *